2 Sheets--Sheet 1.
W. K. MILLER.
Harvester Rakes.
No. 155,964.  Patented Oct. 13, 1874.
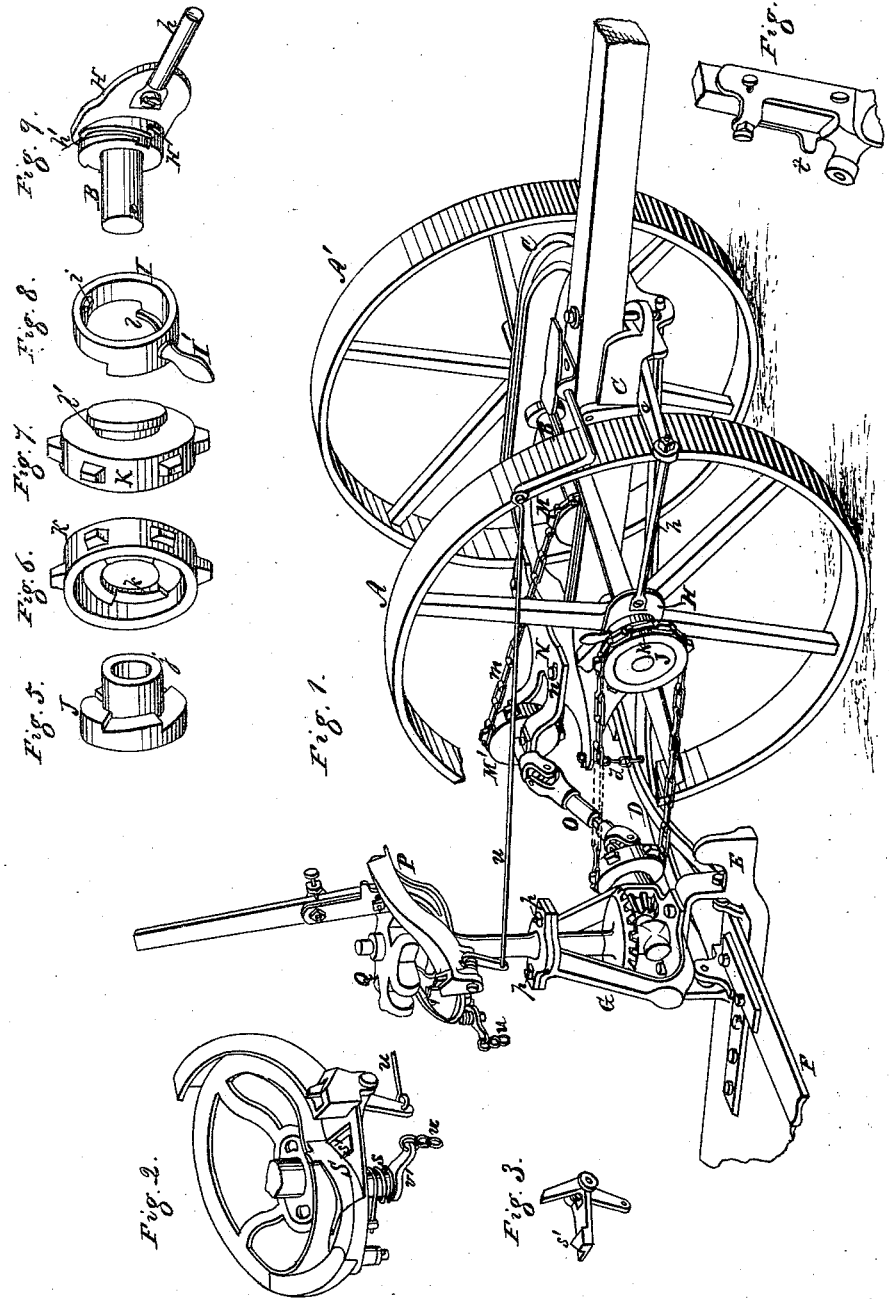

2 Sheets--Sheet 2.

W. K. MILLER.
Harvester Rakes.

No. 155,964. Patented Oct. 13, 1874.

WITNESSES
Jos. S. Peyton.
B. J. Morse

INVENTOR
Wm. K. Miller, by
Wm. D. Baldwin
his, Attorney

THE GRAPHIC CO. PHOTO-LITH. 39 & 41 PARK PLACE, N.Y.

UNITED STATES PATENT OFFICE.

WILLIAM K. MILLER, OF CANTON, OHIO.

IMPROVEMENT IN HARVESTER-RAKES.

Specification forming part of Letters Patent No. 155,964, dated October 13, 1874; application filed April 21, 1874.

*To all whom it may concern:*

Be it known that I, WILLIAM K. MILLER, of Canton, in the county of Stark and State of Ohio, have invented certain new and useful Improvements in Harvester-Rakes, of which the following is a specification:

My invention relates to that class of automatic combined reels and rakes in which revolving rake-heads have the proper rising and falling movements imparted to them by means of a cam-guide and a switch controlled by the driver, to throw the rakes into action, whereby the size of the gavels and the frequency of their discharge may be regulated.

The subject-matter claimed is hereinafter specified.

Figure 10:
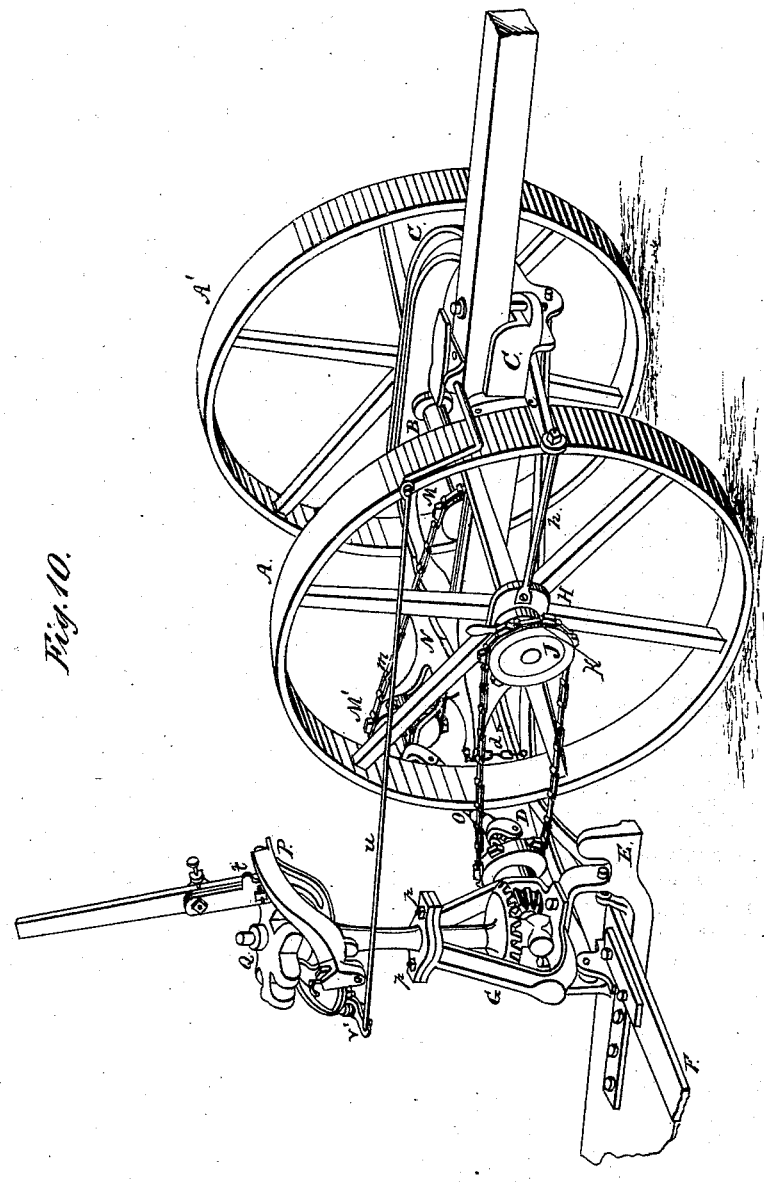
Figure 11:
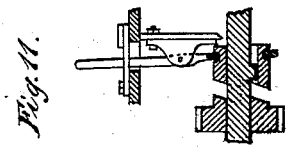

In the accompanying drawings, Figure 1 represents a view, in perspective, of so much of a harvester embracing my improvements as is necessary to illustrate the invention hereinafter claimed; Fig. 2, a view, in perspective, of the guide-cam detached; Fig. 3, a similar view of the switch-locking devices; Fig. 4, a similar view of part of the rake-arm. Figs. 5, 6, 7, 8, and 9 are similar views, showing the details of the clutch-coupling on the main axle, by which the sprocket-wheel which drives the rake is thrown into or out of gear. Fig. 10 is a view similar to Fig. 1, except that the link-rod is attached directly to the spring-switch; and Fig. 11, a vertical longitudinal section through the axle and a sliding clutch, by which to throw the rake-driving sprocket-pulley into and out of gear with the axle.

It is deemed sufficient here to describe those parts only of the mechanism which relate to the machine when organized as a self-raking reaper, the construction of the machine when used as a mower being well known to skillful builders.

The machine shown in this instance is similar in its general features to the one shown in two Letters Patent granted to me June 3, 1873, and numbered, respectively, 139,596 and 139,597.

Two main wheels, A A', are mounted on an axle, B, turning in suitable bearings in a main frame, C. A coupling-frame, D, is, at one end, hinged to this frame, and at the other to a shoe, E, to which a finger-beam, F, is attached. A chain, d, holds the coupling-frame, and consequently the cutting apparatus, at any desired elevation. A yoke, G, mounted on the shoe, supports gearing for driving a combined reel and rake. One way of driving this rake is by sprocket-wheels and a chain on the main axle outside the driving-wheel, as shown in Figs. 1 and 10.

The object of the first part of my invention is to be able to throw the sprocket-wheel into or out of gear at pleasure, to stop and start the rake. This I do by means of the devices shown in Figs. 1, 5, 6, 7, 8, 9, and 10.

An arm, c, projecting from the inner front corner of the main frame, receives a tie-rod, h, which is secured to a plate, H, which fits on the main axle outside the driving-wheel. (See Figs. 1 and 10.) This tie-rod and plate constitute a brace, one purpose of which is to resist the backward pull of the rake-driving chain upon the axle. A boss, H', on the plate H, is provided with grooves h', in which lugs or internal projections i on the inner face of a shipping-ring, I, take. This ring is turned by means of a handle, I', and in turning on the boss it is shifted laterally by the lugs and grooves above mentioned. A clutch, J, is mounted on a thimble, j, fast on the main axle, with which it turns. A corresponding clutch, k, is secured inside the sprocket-wheel K, which moves freely on the thimble j. A flange, l, inside the shipper-ring I, engages with a grooved collar, l', on the back of this sprocket-wheel, which latter is thus caused to move laterally on the shaft as the shipper-ring is turned backward or forward; consequently, the two members of the clutch are thrown into or out of gear at pleasure. In backing, the clutch releases itself as the reverse movement throws the sprocket-wheel out of gear. I thus secure a simple positive clutch mechanism without the use of springs, the working of which is liable to derangement.

Instead of driving the rake by a chain outside the wheels, I prefer to mount a sprocket-wheel, M, on the main axle between the wheels. A chain, m, from this pulley, drives a corresponding one, M', mounted in a bracket-frame, N, bolted upon the main frame by screws n passing through elongated slots in the bracket-frame, so that the tension of the driving-chain may be regulated. An extensible tumbling-shaft, O, connects this sprocket-wheel with the shaft of the gearing which drives the rake. The sprocket-wheel M may be caused to rotate with the axle or disengaged therefrom by a clutch, (see Fig. 11,) such as shown in my Patent No. 139,597, before mentioned.

The rake and reel arms are pivoted to a revolving hub, Q, in a well-known way. A cam-guide, P, is mounted on the yoke, the two being connected by slots and screws $p$, Fig. 1, in a manner which permits the cam readily to be adjusted to impart the proper movement to the rake. The rake and reel arms and the cam are constructed substantially in the manner shown in my Patent No. 139,596, above mentioned. Here, as in that patent, the switch S is thrown open by a spring, $s$, whenever released from the stop $s'$. In my patent above mentioned, this release was effected either by a cord operated by the driver or automatically by a stud, $t$, on the rake-arm.

The object of my present invention is to enable the driver to regulate the size of the gavels at pleasure, by controlling the switch, notwithstanding its release by the stud on the rake-arm. To do this I attach a link, cord, or chain, $u$, directly to the arm $v'$ of the spring-switch S. Thus the driver has only to pull on this cord to prevent the opening of the switch, notwithstanding its release by the rake-arm. By removing the stud $t$ from the rake-arm the switch will be left entirely under the control of the driver, who can thus regulate intervals between the discharge of the gavels at pleasure, which is a great convenience in cutting round corners and in other places.

In practice, I prefer to change the cord $u$ from the stop $s'$ to the spring-switch, instead of using two separate cords, as both will rarely, if ever, be needed at the same time.

The rakes may be placed entirely under the control of the driver by raising up or removing the stud $t$ and attaching the cord or link $u$ to the stop S', as in Fig. 1. By this adjustment of the parts all of the rakes will act as reels or beaters only. But each or either of them may be caused to sweep the platform as a rake, by the use of the cord or link that extends from the foot of the driver to the stop S'. By moving the foot or otherwise drawing on this cord the stop S' will be moved, and the spring-switch S released, opening the way, and allowing the rake to come into action and sweep the platform. But in practice I prefer to set down the stud on one arm only, so that on every revolution of the hub Q the stud $t$ will move the stop S', which will allow the switch S to open and that rake to sweep the platform, while the others act as reels or beaters only. But there are times and places when it is desirable to arrest the operation of that one arm or rake that is adjusted to sweep the platform, such as where the crop is thin on the ground, or to prevent dropping a sheaf at the corners of the piece to be cut, so that the team will walk on it on the next trip around the piece. This desirable result is accomplished by removing the cord or link from the stop S' to the arm $v'$ of the spring-switch S, (see Fig. 10,) so that notwithstanding the operation of the stud $t$ on the stop S' and the release of the switch S, the operator may, by drawing on the cord or link $u$, hold the switch S in its closed position, and thus cause the rake that was adjusted to sweep the platform, to act as a reel or beater only, and to raise up and pass over the cut grain lying on the platform instead of sweeping it off.

I claim as my invention—

1. The combination of the fixed grooved boss, the main axle revolving therein, the shipper-ring turning on the boss, the clutch J turning with the axle, and the sprocket-wheel and its clutch turning on the thimble of the clutch $k$, fast on the axle, these members being constructed and operating in combination, substantially as set forth, to throw the sprocket-wheel into or out of gear.

2. The combination of the cam, the holding-stop, the spring-switch, the arm $v'$, and the cord attached to said arms, operated by the driver, substantially as described, whereby the switch may be kept closed by the driver, notwithstanding its release from its holding-stop.

In testimony whereof I have hereunto subscribed my name.

WM. K. MILLER.

Witnesses:
PAUL D. RIDER,
W. B. GREENWOOD.